United States Patent
Kolding et al.

(10) Patent No.: US 11,362,774 B2
(45) Date of Patent: Jun. 14, 2022

(54) TRANSMISSION ADAPTATION IN A WIRELESS NETWORK

(75) Inventors: Troels Kolding, Klarup (DK); Frank Frederiksen, Klarup (DK); Klaus Pedersen, Aalborg (DK); Istvan Z. Kovacs, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 1794 days.

(21) Appl. No.: 12/051,787

(22) Filed: Mar. 19, 2008

(65) Prior Publication Data

US 2008/0240030 A1 Oct. 2, 2008

Related U.S. Application Data

(60) Provisional application No. 60/895,854, filed on Mar. 20, 2007.

(51) Int. Cl.
*H04L 5/00* (2006.01)
*H04L 1/00* (2006.01)
(Continued)

(52) U.S. Cl.
CPC .......... *H04L 5/0037* (2013.01); *H04L 1/0025* (2013.01); *H04L 1/0026* (2013.01);
(Continued)

(58) Field of Classification Search
CPC .... H04W 72/08; H04L 1/0026; H04L 1/0027; H04L 1/0029
(Continued)

(56) References Cited

U.S. PATENT DOCUMENTS 7,986,612 B2 * 7/2011 Duan et al. .................. 370/206
2004/0028020 A1 2/2004 Frederiksen et al.
(Continued)

FOREIGN PATENT DOCUMENTS

CN 1930803 A 3/2007
EP 1187413 A1 3/2002
(Continued)

OTHER PUBLICATIONS

"International Search Report and Written Opinion for PCT Patent Application No. PCT/IB2008/000665, dated Jan. 29, 2009, 16 pages."

(Continued)

*Primary Examiner* — Sulaiman Nooristany
(74) *Attorney, Agent, or Firm* — Harrington & Smith (57) ABSTRACT

Various example embodiments are disclosed relating to transmission adaptation in a wireless network. According to another example embodiment, an apparatus may include a processor. The processor may be configured to measure a channel quality for a plurality of wireless resources (e.g., physical resource blocks), determine one or more proposed resources based on the measured channel quality for the wireless resources, determine at least one proposed transmission parameter based on a number of the proposed wireless resources and the channel quality of the proposed wireless resources, and send a report to an infrastructure node, the report including the at least one proposed transmission parameter and identifying the proposed wireless resources.

18 Claims, 6 Drawing Sheets

(51) Int. Cl.
*H04L 5/02* (2006.01)
*H04L 27/26* (2006.01)
*H04W 72/08* (2009.01)

(52) U.S. Cl.
CPC ............ *H04L 1/0028* (2013.01); *H04L 5/006* (2013.01); *H04L 5/0046* (2013.01); *H04L 5/023* (2013.01); *H04L 27/2608* (2013.01); *H04L 1/0003* (2013.01); *H04L 1/0007* (2013.01); *H04L 1/0009* (2013.01); *H04L 5/0007* (2013.01); *H04W 72/08* (2013.01)

(58) Field of Classification Search
USPC ........................................................ 370/329
See application file for complete search history.

(56) References Cited

U.S. PATENT DOCUMENTS

| | | | |
|---|---|---|---|
| 2005/0025254 A1* | 2/2005 | Awad .................... | H04L 1/0003 375/295 |
| 2005/0159162 A1* | 7/2005 | Park ............................. | 455/450 |
| 2005/0180354 A1 | 8/2005 | Cho et al. | |
| 2005/0201309 A1* | 9/2005 | Kang et al. ................... | 370/310 |
| 2007/0098098 A1* | 5/2007 | Xiao et al. ................... | 375/260 |
| 2008/0187030 A1* | 8/2008 | Khan .................... | H04B 7/063 375/219 |

FOREIGN PATENT DOCUMENTS

| | | | |
|---|---|---|---|
| EP | 1575326 A2 | 9/2005 | |
| EP | 1598975 A2 | 11/2005 | |
| WO | 2004/100480 A1 | 11/2004 | |
| WO | 2008/114134 A2 | 9/2008 | |

OTHER PUBLICATIONS

Thoen, S. et al., "Predictive adaptive loading for Hiperlan II", Vehicular Technology Conference, IEEE VTS Fall VTC; vol. 5, (Sep. 24, 2000), pp. 2166-2172.

Holland, G. et al., "A Rate-Adaptive MAC Protocol for Multi-Hop Wireless Networks", Proceedings of the 7th Annual International Conference on Mobile Computing and Networking . Mobicom; vol. 7, (Jul. 16, 2001), pp. 236-250.

Daji, Q. et al., "Adaptive transmit power control in IEEE 802.11a wireless LANs", IEEE Semiannual Vehicular Technology Conference Proceedings; vol. 1, (Apr. 22, 2003), pp. 433-437.

"3GPP TS 25,214 V7.3.0: 3rd Generation Partnership Project; Technical Specification Group Radio Access Network; Physical Layer Procedures (FDD) Release 7", (Dec. 2006),1-60.

Choi, Young-June "Selective Channel Feedback Mechanisms for Wireless Scheduling", School of Electrical Engineering and Computer Science, Seoul National University; World of Wireless, Mobile and Multimedia Networks, 2006. WoWMoM 2006. International Symposium, (2006),1-35.

Sun, Yakun et al., "Multi-User Scheduling for OFDM Downlink with Limited Feedback for Evolved UTRA", IEEE, Motorola, IL, (2006),1-5.

Kolding, T. E., et al., "Low-Bandwith Channel Quality Indication for OFDMA Frequency Domain Packet Scheduling", Nokia Networks, Aalborg University, Denmark, (Sep. 2006),1-5.

Ekstrom, Hannes et al., "Technical Solutions for the 3G Long-Term Evolution", Communications Magazine, IEEE, vol. 44, Issue: 3, (Mar. 2006),1-8.

"Throughput Analysis of Band AMC Scheme in Broadband Wireless OFDMA System", Sung Kyung Kim, et al., IEEE 2006, pp. 1305-1310.

"CQI reporting procedure for downlink scheduling", ETRI, 3GPP TSG RAN WG2#56, R2-063276, Nov. 2006, 3 pgs.

"CQI reporting for downlink scheduling", ETRI, 3GPP TSG RAN WG2#55, R2-062877, Oct. 2006, 2 pgs.

Nanda, Sanjiv, et al., "Adaptation Techniques in Wireless Packet Data Services", IEEE Communications Magazine, Jan. 2000, pp. 54-64.

* cited by examiner

TRANSMISSION ADAPTATION IN A WIRELESS NETWORK

CROSS-REFERENCE TO RELATED APPLICATIONS

This application claims priority based on U.S. Provisional Application No. 60/895,854, filed on Mar. 20, 2007, entitled, "Transmission Adaptation in a Wireless Network," the disclosure of which is hereby incorporated by reference.

BACKGROUND

A number of different techniques have been employed to use wireless media or wireless resources more efficiently. For example, it is common for wireless nodes or devices to provide rate adaptation, where a modulation scheme may be adjusted based on changing channel conditions. This may allow higher order modulation schemes to be used where channel conditions are more favorable.

For example, as described in "WCDMA for UMTS— Radio Access For Third Generation Mobile Communications", H. Holma and A. Toskala (editors), 2005, wireless technologies such as Wideband Code-Division Multiple Access (WCDMA) through high-speed downlink packet access (HSDPA) and Third Generation Partnership Project (3GPP) UTRAN Long Term Evolution may allow improved exploitation of radio channel variations through link adaptation and channel dependent scheduling. Data transmission rate may be adjusted based on downlink channel quality information (CQI) provided as feedback from the wireless node (or user terminal, UE) to the scheduler located in the infrastructure node (or base station, eNodeB).

In addition to adaptation in the time-domain as exemplified in e.g., HSDPA, wireless systems based on orthogonal frequency domain multiple access (OFDMA), such as the UTRAN Long Term Evolution "Technical Solution for the 3G Long-Term Evolution," Ekstrom, et al, March, 2006 allow for channel dependent scheduling also in the frequency domain provided that information about the channel quality in both time and frequency at each UE location are available at the scheduling node. For example, resources, such as different frequency domain resources, which may be, groups of sub-carriers (such as groups of contiguous subcarriers) in the frequency domain may be considered the physical resource blocks (PRB), wireless resources or just the channels. Other types of resources, or wireless resources, may be used as well.

In addition, there are different techniques that have been developed to report channel quality information (CQI) to a packet scheduler for OFDMA systems. For example, the best-M method allows a wireless node to report channel quality information for the M highest quality channels. As another example, a threshold CQI technique may be employed, where a wireless node may report channel quality information for the best or highest quality channel, and for other channels having a channel quality that is within a specific threshold of the best or highest quality channel. Unfortunately, even when reporting channel quality information, such as a signal to interference and noise ratio (SINR), this information may be interpreted inconsistently, or used in different manners to select and adjust the transmission parameters differently at different nodes. Improved techniques are desirable.

SUMMARY

According to an example embodiment, a method may include measuring a channel quality for a plurality of wireless resources, determining one or more proposed resources based on the measured channel quality for each of the wireless resources, determining at least one proposed transmission parameter based on a number of the proposed resources and the channel quality of the proposed resources, and sending a report to an infrastructure node, the report including the at least one proposed transmission parameter and identifying the proposed resources.

According to another example embodiment, a method may include determining, at a wireless node, a channel quality (or channel quality measure or indication) associated with each of a plurality of physical resource blocks (PRBs), determining, based on the channel qualities of the PRBs, a proposed set of PRBs for use in transmitting to the wireless node, determining, based on a number of the PRBs in the proposed set of PRBs, a proposed set of transmission parameters that includes at least one parameter, and sending a report to an infrastructure node, the report identifying the proposed set of PRBs and the proposed set of transmission parameters.

According to yet another example embodiment, a method may include determining, at a wireless node, a channel quality associated with each of a plurality of physical resource blocks (PRBs), determining, based on the PRB channel qualities, a proposed set of PRBs for use in transmitting to the wireless node, determining, based on a reference number of PRBs and the channel qualities of the proposed set of PRBs, a proposed set of transmission parameters that includes at least one parameter, the reference number of PRBs being equal to the number of PRBs in the proposed set of PRBs, and sending a report to an infrastructure node, the report identifying the proposed set of PRBs and the proposed set of transmission parameters.

According to another example embodiment, an apparatus may include a wireless transceiver and a processor. The processor may be configured to measure a channel quality for a plurality of wireless resources, determine one or more proposed resources based on the measured channel quality for each of the wireless resources, determine at least one proposed transmission parameter based on a number of the proposed resources and the channel quality of the proposed resources, and send a report to an infrastructure node, the report including the at least one proposed transmission parameter and identifying the proposed wireless resources.

According to another example embodiment, an apparatus may include a wireless transceiver and a processor. The processor may be configured to determine, at a wireless node, a channel quality associated with each of a plurality of physical resource blocks (PRBs), determine, based on the PRB channel qualities, a proposed set of PRBs for use in transmitting to the wireless node, determine, based on a number of the PRBs in the proposed set of PRBs, a proposed set of transmission parameters that includes at least one parameter, and send a report to an infrastructure node, the report identifying the proposed set of PRBs and the proposed set of transmission parameters.

According to yet another example embodiment, an apparatus may include a wireless transceiver and a processor. The processor may be configured to determine, at a wireless node, a channel quality associated with each of a plurality of physical resource blocks (PRBs), determine, based on the PRB channel qualities, a proposed set of PRBs for use in transmitting to the wireless node, determine, based on a reference number of PRBs and the channel qualities of the proposed set of PRBs, a proposed set of transmission parameters that includes at least one parameter, the reference number of PRBs being equal to the number of PRBs in the proposed set of PRBs, and send a report to an infrastructure node, the report identifying the proposed set of PRBs and the proposed set of transmission parameters.

According to another example embodiment, an apparatus may include means for measuring a channel quality for a plurality of wireless resources, means for determining one or more proposed wireless resources based on the measured channel quality for each of the wireless resources, means for determining at least one proposed radio transmission parameter based on a number of the proposed wireless resources and the channel quality of the proposed wireless resources, and means for sending a report to an infrastructure node, the report including the at least one proposed radio transmission parameter and identifying the proposed wireless resources.

According to another example embodiment, an apparatus may include means for determining, at a wireless node, a channel quality associated with each of a plurality of physical resource blocks (PRBs), means for determining, based on the PRB channel qualities, a proposed set of PRBs for use in transmitting to the wireless node, means for determining, based on a number of PRBs in the proposed set of PRBs, a proposed set of radio transmission parameters that includes at least one parameter, and means for sending a report to an infrastructure node, the report identifying the proposed set of PRBs and the proposed set of radio transmission parameters.

According to yet another example embodiment, an apparatus may include means for determining, at a wireless node, a channel quality associated with each of a plurality of physical resource blocks (PRBs), means for determining, based on the PRB channel qualities, a proposed set of PRBs for use in transmitting to the wireless node, means for determining, based on a reference number of PRBs and the channel qualities of the proposed set of PRBs, a proposed set of radio transmission parameters that includes at least one parameter, the reference number of PRBs being equal to the number of PRBs in the proposed set of PRBs, and means for sending a report to an infrastructure node, the report identifying the proposed set of PRBs and the proposed set of radio transmission parameters.

According to yet another example embodiment, a method may include: determining, at a wireless node, a channel quality associated with each of a plurality of physical resource blocks (PRBs), determining, based on the PRB channel qualities, a proposed set of PRBs for use in transmitting to the wireless node, and sending a CQI report to an infrastructure node, the CQI report including a parameter ID that identifies a modulation scheme and a coding rate that may be used for transmission to the wireless node via the proposed set of PRBs to provide or achieve a specific block error probability.

The details of one or more implementations are set forth in the accompanying drawings and the description below.

DETAILED DESCRIPTION

Figure 1:
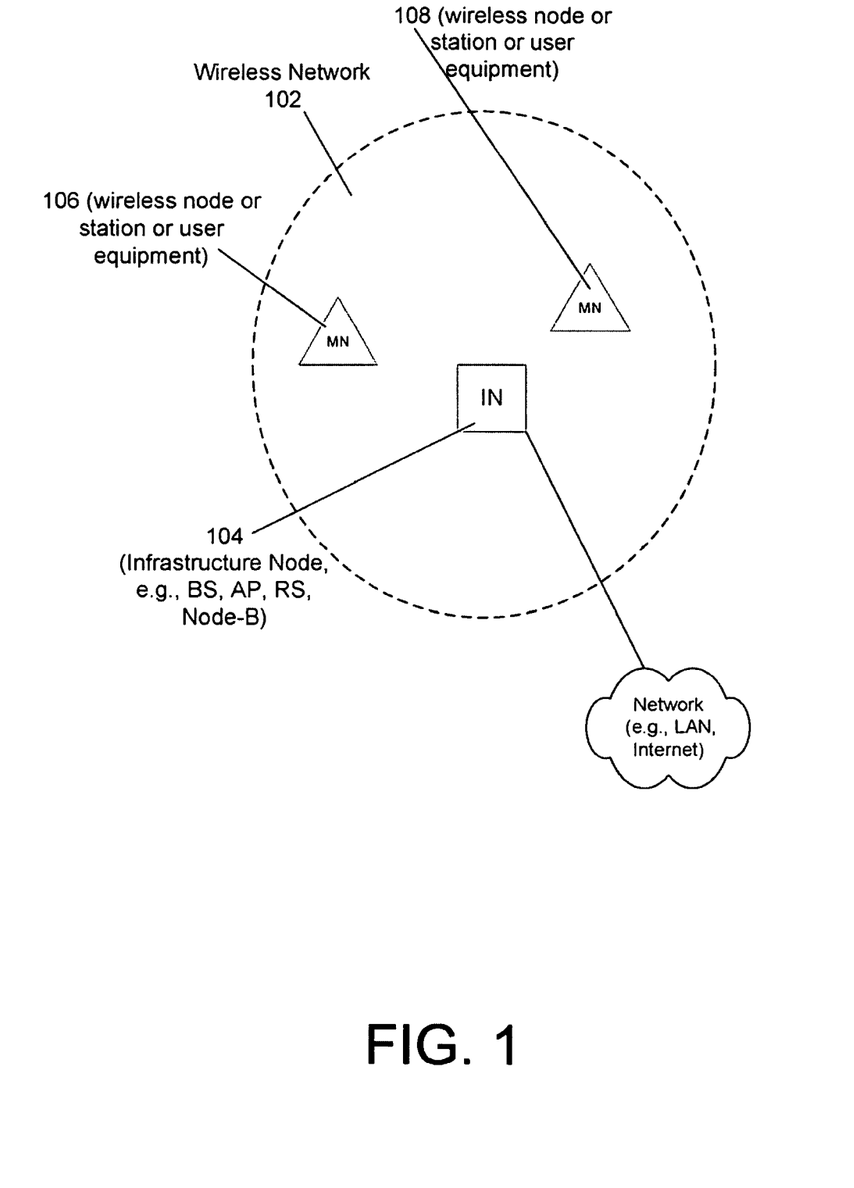
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as a wireless infrastructure node 104 (which may include an access point (AP) or base station, relay station, a node B, or the like), and one or more mobile nodes or mobile stations (or user equipment), such as wireless nodes 106 and 108. While only one wireless infrastructure node 104 and two wireless nodes or mobile stations (or user equipment) 106, 108 are shown in wireless network 102, any number may be provided. Each wireless node, e.g., nodes 106, 108, in network 102 may be in wireless communication with the wireless infrastructure node 104, and may even be in direct communication with each other. Wireless infrastructure node 104 may be coupled to a fixed network, such as a Local Area Network (LAN), Wide Area Network (WAN), Radio Access Network (RAN), the Internet, etc., and may also be coupled to other wireless networks.

The various embodiments described herein may be applicable to a wide variety of wireless network technologies, such as, for example, WLAN (wireless local area network) networks (e.g., IEEE 802.11 type networks), IEEE 802.16 Wi MAX networks, cellular networks, 3GPP related networks including Long Term Evolution (LTE) of 3GPP, HSDPA (high speed downlink packet access), UMTS Terrestrial Radio Access Network (UTRAN), wireless networks based on orthogonal frequency division multiplexing (OFDM), orthogonal frequency division multiple access (OFDMA) or other techniques, radio networks, or other wireless networks. These are merely some example networks or technologies, and the various embodiments described herein are not limited thereto. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode, as well as an ad-hoc mode in which wireless nodes or stations may communicate directly via a peer-to-peer network, for example.

The term "wireless node" or "node," or wireless station or the like, may include, for example, a wireless mobile device, an access point (AP), base station or other infrastructure node, a wireless personal digital assistant (PDA), a cell phone, an 802.11 WLAN phone, a wireless mesh point, or any other wireless device. An infrastructure node may include, as examples, a base station, an access point, a relay station, a node-B, or any other infrastructure node. These are merely a few examples of the wireless devices that may be used to implement the various embodiments described herein, and this disclosure is not limited thereto.

According to an example embodiment, a wireless node (e.g., wireless node 106) may measure a channel quality for a plurality of wireless resources (e.g., physical resource blocks or PRBs), determine one or more proposed resources based on the measured channel quality for the wireless resources, and determine at least one proposed transmission parameter based on a number of the proposed resources and the channel quality of the proposed resources. The wireless node (e.g., node 106) may send a report to an infrastructure node (e.g., node 104). The report may identify the proposed set of transmission parameters that includes at least one parameter and the proposed wireless resources for use by infrastructure node 104 for transmission to wireless node 106. A number of various example details will now be explained in greater detail.

According to an example embodiment, wireless resources may be allocated to or used by different user terminals or wireless nodes. For example, wireless resources may include different channels, different subcarriers or frequencies, time slots or transmission time intervals (TTIs), codes (e.g., for CDMA or the like), spatial resources (e.g. for multi-antenna systems), or other resources, or a combination thereof. The resources may be separated into different or discrete chunks or blocks, which may be referred to as, for example, a physical resource block (PRB) or resource unit (RU). Other terms may be used as well, and the term PRB and RU are merely examples and this disclosure is not limited thereto A PRB, for example, may include a group of (or one or more) subcarriers, such as a group of OFDM subcarriers. In another example embodiment, each PRB may include a plurality of (e.g., 12 or 25 or 50) subcarriers for a time slot or transmission time interval (TTI) of 2 ms (or other TTI value), although this is merely an example of a PRB, and a PRB may include any type or combination of resources, for example. Thus, in such an example, each PRB may include frequency resources (one or more subcarriers) and time resources (a time slot or TTI). A different set of subcarriers may be provided for each different PRB, for example.

The channel conditions of the various channels or wireless resources may vary over time. These variations in channel quality or radio channel conditions may be used to allocate resources to different users or nodes at various times.

For example, each wireless node 106, 108 in wireless network 102 may monitor or measure the channel quality of each of a plurality of wireless resources, and may report this channel quality information to the infrastructure node 104. According to an example embodiment, infrastructure node 104 may transmit signals on pilot tones for each wireless resource or PRB. For example, if a PRB includes 12 subcarriers (as an example), the infrastructure node 104 may transmit pilot tones or pilot reference symbols on 4 of the 12 subcarriers for each of the example 50 PRBs. Alternatively, the infrastructure node 104 may transmit pilot tones on all 12 subcarriers. Data, rather than pilot tones, received on some subcarriers may also be used by wireless node to measure channel quality for some subcarriers and wireless resources.

Wireless node 106 may measure the channel quality for each resource, such as by measuring or calculating a signal to interference and noise ratio (SINR) or other quality measurement. For example, the channel quality (e.g., SINR) may be measured for one or more of the subcarriers (or even all of the subcarriers) of a PRB, based on received pilot tones and/or received data, for example. The wireless node 106 may then calculate a channel quality associated with the PRB, which may be calculated in a variety of different ways, such as an average SINR for (or average SINR across) a plurality (or even all 12) of the subcarriers of the PRB. This average SINR, as an example, for the subcarriers of the PRB may be considered to be a channel quality of (or associated with) the PRB. The wireless node 106 may measure or determine a channel quality associated with each (or one or more) of the PRBs that the wireless node 106 is monitoring. For example, the wireless node 106 may be monitoring 50 PRBs (or 50 groups of subcarriers), with each PRB having 12 OFDM subcarriers as an example. This is merely an example, and any number of subcarriers may be used, and other types of wireless resources may be used. For example, the use of 12 subcarrier and 50 PRBs may correspond to one measurement/estimation setup, and may vary due to configuration and system bandwidth, and/or the network technology or requirements, for example.

In an example embodiment, wireless node 106 (and other wireless nodes) may determine or select a subset of PRBs or resources to report or propose to node 104 for use in communicating to wireless node 106 (e.g., to be used for downlink transmission from infrastructure node 104 to wireless node 106). The proposed PRBs may typically be, for example, PRBs having a relatively good (or usable) channel quality, or may even be a set of one or more PRBs having the highest associated channel quality (of the group of monitored PRBs), etc.

A number of different techniques may be used to determine or select a proposed set (or subset) of PRBs. For example, wireless node 106 may use a best-M method, for example, to select or determine the M PRBs having the best (or highest) channel quality. M may be a number established or fixed by the infrastructure node 104 and communicated to the wireless nodes 106, 108, or set by another mechanism, and may be changed from time to time. Or, a threshold CQI technique may be used, for example, to select or determine a PRB having a highest or best quality (e.g., highest SINR) and any other PRBs having a channel quality (e.g., SINR) within a threshold or specific distance of the highest quality PRB, or within a quality threshold relative to the PRB of the highest quality. These may be considered as a proposed set of PRBs, as they may be proposed or suggested by the wireless node 106 to infrastructure node 104 for transmission to wireless node 106. The threshold, like the M value, may be set by the infrastructure node and communicated to the wireless nodes 106, 108.

Wireless node 106 may also determine at least one proposed transmission parameter (or a proposed set of transmission parameters), e.g., which may be proposed by wireless node 106 for use by infrastructure node 104 for downlink transmission to wireless node 106. The proposed transmission parameter(s) may include, as examples, one or more of a data transmission rate, a modulation scheme, a coding rate, a block size or transport block size, antenna weightings, pre-coding information (or other parameters) or associated with MIMO (in the case of multiple input, multiple output or MIMO systems) or other transmission parameters. The modulation scheme may be any modulation scheme, such as, for example, BPSK (binary phase shift keying), QPSK (quadrature phase shift keying), QAM (quadrature amplitude modulation) or other modulation scheme.

In an example embodiment, the wireless node may determine at least one proposed transmission parameter (e.g., a modulation scheme and coding rate) based on a number of the proposed PRBs or wireless resources and the overall (e.g., average) channel quality or separate channel qualities of the proposed wireless resources. The average may include, for example, a geometric average of SINRs of the proposed PRBs, where geometric average may include, converting linear SINRs to dB, averaging the dB values, and converting the average dB value back to a linear value, as an example.

The proposed transmission parameters may be, for example, one or more maximum transmission parameters (e.g., highest modulation scheme and coding rate) that may be supported based on use of the proposed resources or PRBs and the channel quality of the proposed wireless resources to achieve a specific performance target. Or, the wireless node may determine or select a set of proposed transmission parameters that may provide or achieve a target error rate or performance target at the wireless station or node 106) based on the transmission of data to the wireless node using the proposed set of transmission parameters and using the proposed set of PRBs based on the channel quality (or channel qualities) of the proposed set of PRBs. For example, based on the average SINR for the proposed PRBs, the highest modulation scheme and coding rate may be selected that will provide a block error probability of 10%.

Normally, a wireless communication system will use forward error correction, where a user payload is appended redundancy information to provide error recovery when parts of the wireless communication fail. Examples of forward error correction methods include but are not limited to convolutional codes and turbo codes. A forward error correction scheme is typically characterized by the amount of redundancy that is added to the payload. The ratio of the payload bits to the number of bits transmitted on the physical resource is typically called the effective code rate. On each of the symbols available in the physical resource, it is possible to transmit a number a bits, which will be determined by the modulation scheme. In context of LTE within 3GPP, the transport block size will correspond to the payload size.

A physical resource size (PRS) may be equal to:
PRS=(# of PRBs)*(PRB block size), which is the number of PRBs multiplied times the PRB block size (which may be fixed for example). The PRB may be a set or a fixed number of symbols. As the number of PRBs used for transmission (or proposed number of PRBs) increase, the physical resource size and correspondingly the transport block size will also increase. Block coders or other coders, such as turbo coders, may typically improve in performance as the coding block size increases. Thus, a higher coding rate may be used for a larger block size for a same SINR to achieve the same BLEP (block error probability), for example. Thus, determining or calculating the transmission parameters (e.g., modulation scheme and coding rate) may typically be effected by the number of PRBs (or effectively the transport block size) that will be used for transmission. Therefore, it may be useful to have an accurate number of the PRBs that will be used for transmission to determine transmission parameters.

According to an example embodiment, a reference number of PRBs may be used to determine a proposed set of transmission parameters, and the reference number may be different from the number of proposed PRBs. However, in such case (where the reference number of PRBs may be different from the proposed number of PRBs), a wireless node may determine or estimate transmission parameters, such as modulation scheme and coding rate, based on a reference number of PRBs (e.g., one PRB), while the wireless node may propose a different number of PRBs for use by the infrastructure node for transmission to wireless node.

While this may be done, a mismatch between the reference number of PRBs to calculate or determine proposed transmission parameters and a proposed number of PRBs may increase the likelihood that the reporting wireless node may overestimate or underestimate the transmission parameters that should (or may likely) be used by the infrastructure node for transmitting data to the reporting wireless node. For example, if 10 PRBs are proposed to an infrastructure node (recommended for transmission to wireless node 106), but wireless node 106 uses only one (1) PRB in determining transmission parameters for the measured PRB channel qualities, the determined transmission parameters may typically be underestimated due to a smaller TBS (or smaller number of PRBs) used for calculation, as compared to up to may be 10 PRBs that may be used by the infrastructure node 104 for transmission.

Therefore, according to an example embodiment, it may be useful to match the reference number of PRBs used for determining or calculating the proposed transmission parameters to the number of proposed PRBs. Thus, in such case, the reference number of PRBs may vary as the number of proposed PRBs changes, e.g., as in threshold CQI where the number of PRBs determined within the threshold may vary. This may provide a closer match between proposed transmission parameters for the proposed PRBs and the transmission parameters and PRBs that may likely be used by the infrastructure node 104 for transmission. This may result in higher performance, by providing transmission parameters and PRBs that may provide performance that more closely matches a performance target (e.g., 10% BLEP).

In an example embodiment, wireless node 106 (as well as the other wireless nodes in network 102) may send a report (e.g., which may be known as a CQI report or channel quality indication report, measurement report, channel report or the like) to the infrastructure node 104. The report may identify the proposed PRBs (or proposed resources) and the proposed set of transmission parameter(s), and possibly other information. These reports may be sent periodically, to provide updated or current information to the infrastructure node. As noted above, the report may identify one or more proposed PRBs, e.g., which may have been selected or determined by the reporting wireless node 106 based on one or more channel quality measurements, such as SINR, or average SINR, or geometric average of SINRs of subcarriers for the PRB, or other technique. By sending the report, the reporting wireless node 106 may, for example, be identifying the proposed or suggested PRBs with favourable channel quality, e.g., that are being suggested or proposed for use. The report may also include proposed transmission parameters that are suggested or proposed for use, e.g., used in conjunction with use of the proposed PRBs. For example, it may be determined by the wireless node 106, that when the infrastructure node 104 transmits data to the reporting wireless node 106 using the proposed PRBs and using the proposed transmission parameters (e.g., proposed modulation scheme and coding rate), the block error probability is determined or estimated to be less than or equal to a threshold or target level (e.g., less than 10% BLEP), based on the current channel quality associated with each PRB.

The report may also include the channel quality associated with each proposed PRB, or may include an average channel quality (or average SINR) across the one or more proposed PRBs, for example.

Figure 2:
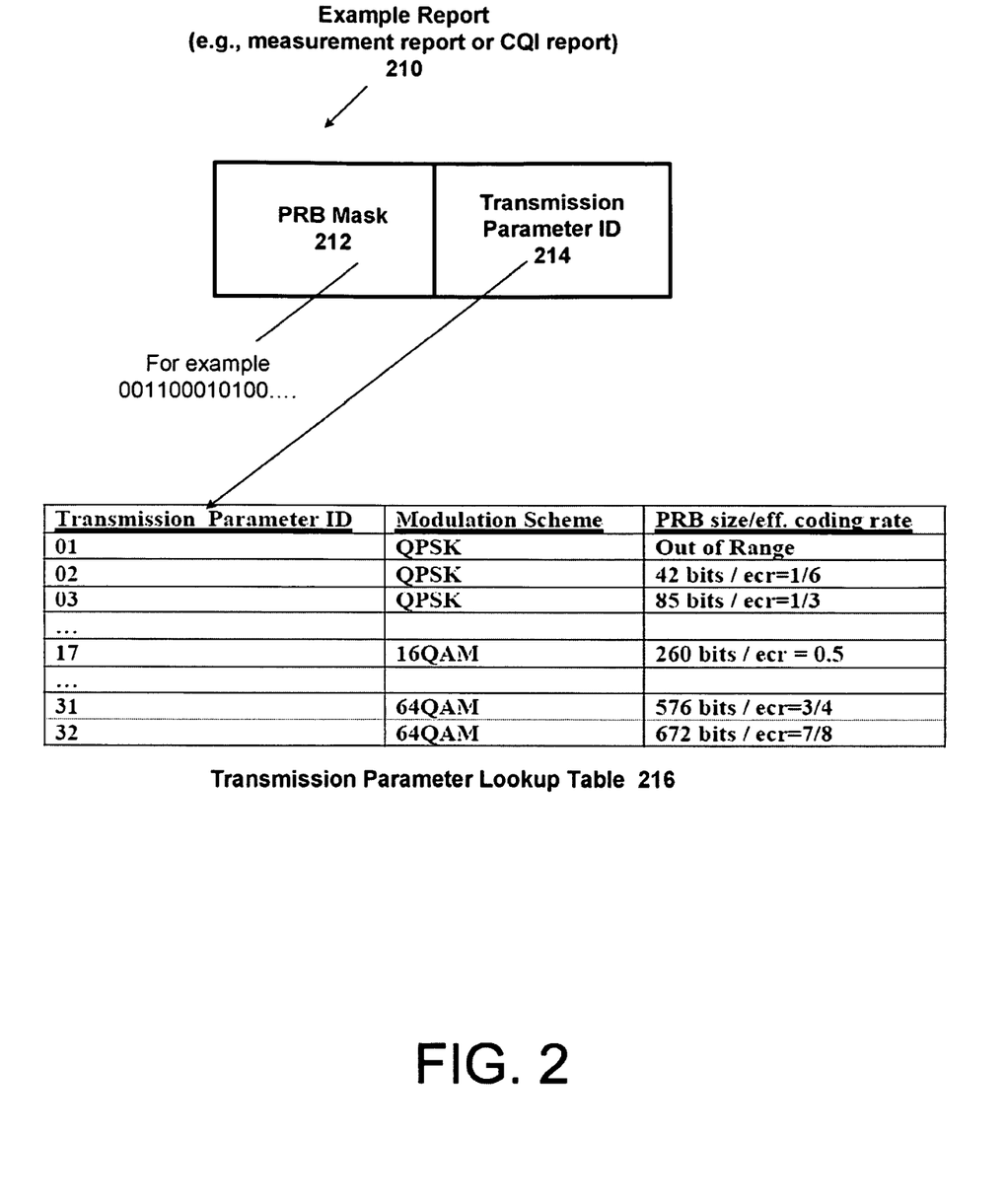
FIG. 2 is a diagram illustrating a report according to an example embodiment.

FIG. 2 is a diagram illustrating a report according to an example embodiment. Report 210, which may sometimes be referred to as a CQI report, or measurement report, etc., may include a PRB mask 212. In an example embodiment, PRB mask 212 may indicate or identify the proposed PRBs (or wireless resources). There may be, for example, one bit for each of the 50 PRBs, where a one (1) may indicate that the corresponding PRB is proposed or recommended, and a zero (0) indicates that the corresponding PRB is not being proposed for use by the infrastructure node for transmission to the wireless node.

The report 210 may also include a transmission parameter ID 214, which may be a value that identifies one or more proposed transmission parameters. In an example embodiment, transmission parameter ID 214 may be a value that identifies an entry or row in a transmission parameter lookup table 216. In an example embodiment, transmission parameter lookup table 216 may indicate a modulation scheme, and a PRB size and/or coding rate (or other parameters). For example, because a PRB may be of fixed or known size in symbols (according to an example embodiment), the modulation scheme and coding rate combined with the physical resource size may, for example, determine the transport block size in bits, or a modulation scheme and PRB size in bits combined with a suggested transport block size may determine the coding rate, as examples.

For example, a transmission parameter ID 214 of 1, may indicate out of range (which may correspond to a low SINR or low channel quality). A transmission parameter ID 214 of 02 may identify a QPSK modulation scheme, an effective coding rate of ⅙, and a transport block size per PRB of 42 bits. A transmission parameter ID of 32, which may correspond to a much higher SINR or channel quality for the proposed PRBs, may correspond to a 64 QAM modulation scheme, a transport block size per PRB of 672 bits, and an effective coding rate of ⅞. Other examples are shown in the example of FIG. 2. This is merely an example measurement report and lookup table, and many other formats may be used.

In an example embodiment, the transmission parameter lookup table 216 may be a standard table of values and may be known by nodes 104 and 106, and 108 in advance (such as values based on a standard or specification), or may be exchanged between infrastructure node 104 and wireless nodes 106, 108, e.g., at network entry or network registration, or provided via another mechanism.

After receiving the reports (e.g., measurement report 210) from one or more wireless nodes 106, 108, etc., the infrastructure node 104 may then allocate or identify resources or PRBs to be used for downlink transmission from the infrastructure node 104 to each wireless node (e.g., selecting one or more, or even all, of the proposed PRBs for each link to a wireless node), and may select one or more transmission parameters. Infrastructure node 104 may send a message to each wireless node 106, 108, indicating the selected PRBs and selected transmission parameters that will be used for transmission to the wireless node. Infrastructure node 104 may transmit signals or data to each wireless node, e.g., using the indicated PRBs and transmission parameters. For example, infrastructure node 104 may use the proposed PRBs and proposed transmission parameters for transmission to each respective wireless node (e.g., use the proposed PRBs/parameters from node 106 to transmit to node 106, use the proposed PRBs/parameters from node 108 to transmit to node 108).

Or, in an example embodiment, infrastructure node 104 may select PRBs (or a number of PRBs) and transmission parameters that are different from those recommended by the wireless nodes. If a number of PRBs and transmission parameters are used that are different than the proposed PRBs/parameters, the infrastructure node may compensate by adjusting one or both of the number of PRBs or transmission parameters, since e.g., coding may be more effective for larger coding blocks or for larger number of PRBs. For example, if fewer PRBs are used for transmission than what was proposed, the infrastructure node 104 may compensate by using lower modulation scheme and/or coding rate.

The infrastructure node 104 may, in some cases, test or verify that the wireless node 106 is able to perform at the target performance level using the proposed PRBs and proposed transmission parameters. For example, the infrastructure node 104 may send data to the wireless node 106 using the proposed PRBs and using the proposed transmission parameters. Infrastructure node 104 may then verify that the block error rate (or other performance value, metric), for example, based on receipt of acknowledgements/negative acknowledgements from wireless node 106, is less than the target block error rate (e.g., less than or equal to 10% block error rate). If the error rate is greater than the threshold or target performance level, then the infrastructure node 104 may adjust the number of PRBs and/or radio transmission parameters (e.g., use lower modulation scheme or lower coding rate or more PRBs) and then re-test the performance of the wireless node. This process may continue until an acceptable performance level is reached, and may periodically undergo adjustment based on new reports 210.

For example, by providing actual recommended or proposed PRBs and radio transmission parameters (e.g., rather than merely channel quality information), the infrastructure node may use the specific PRBs and radio transmission parameters recommended or proposed by each wireless node. This may decrease the likelihood of different devices or different nodes interpreting SINR or channel quality information differently, and/or calculating radio transmission parameters in different manners, etc., which may result in underestimating or overestimating the radio transmission parameters that can be supported based on reported channel quality information, for example.

In an example embodiment, if the infrastructure node 104 has been selecting for use less than all proposed PRBs for transmission to a wireless node 106, the infrastructure node 104 may decrease the value M (for best-M technique) or decrease the threshold (for threshold CQI technique) so that the wireless node will now typically propose fewer PRBs in their report 210 to the infrastructure node 104. This may increase the likelihood that the infrastructure node will use all of the proposed resources or PRBs for transmission. Similarly, if there is little congestion and/or many unused resources/PRBs in a network, the infrastructure node 104 may increase the value M (for best-M) and the threshold (for threshold CQI technique) such that the wireless nodes in the network may typically propose or suggest a greater number of proposed PRBs in their reports 210.

Figure 6:
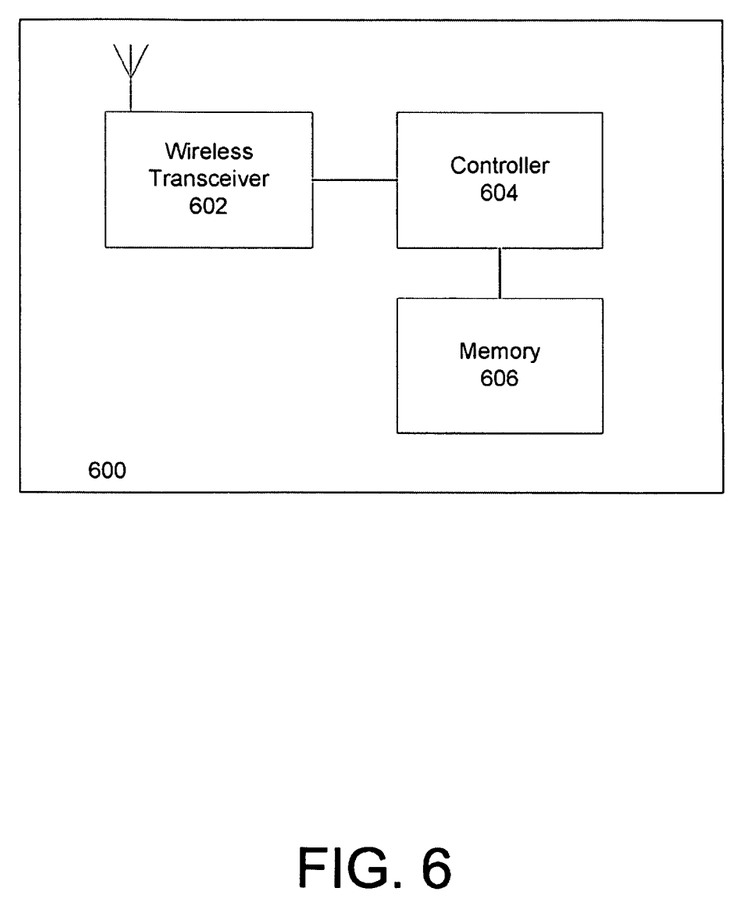
FIG. 6 is a block diagram illustrating an apparatus that may be provided in a wireless node according to an example embodiment.

FIG. 6 is a block diagram illustrating an apparatus 600 that may be provided in a wireless node according to an example embodiment. The wireless node (e.g. station or AP) may include, for example, a wireless transceiver 602 to transmit and receive signals, a controller 604 to control operation of the station and execute instructions or software, and a memory 606 to store data and/or instructions.

Controller (or processor) 604 may be programmable and capable of executing software or other instructions stored in memory or on other computer media to perform the various tasks and functions described herein.

In addition, a storage medium may be provided that includes stored instructions, when executed by a controller or processor that may result in the controller 604, or other controller or processor, performing one or more of the functions or tasks described herein.

Figure 3:
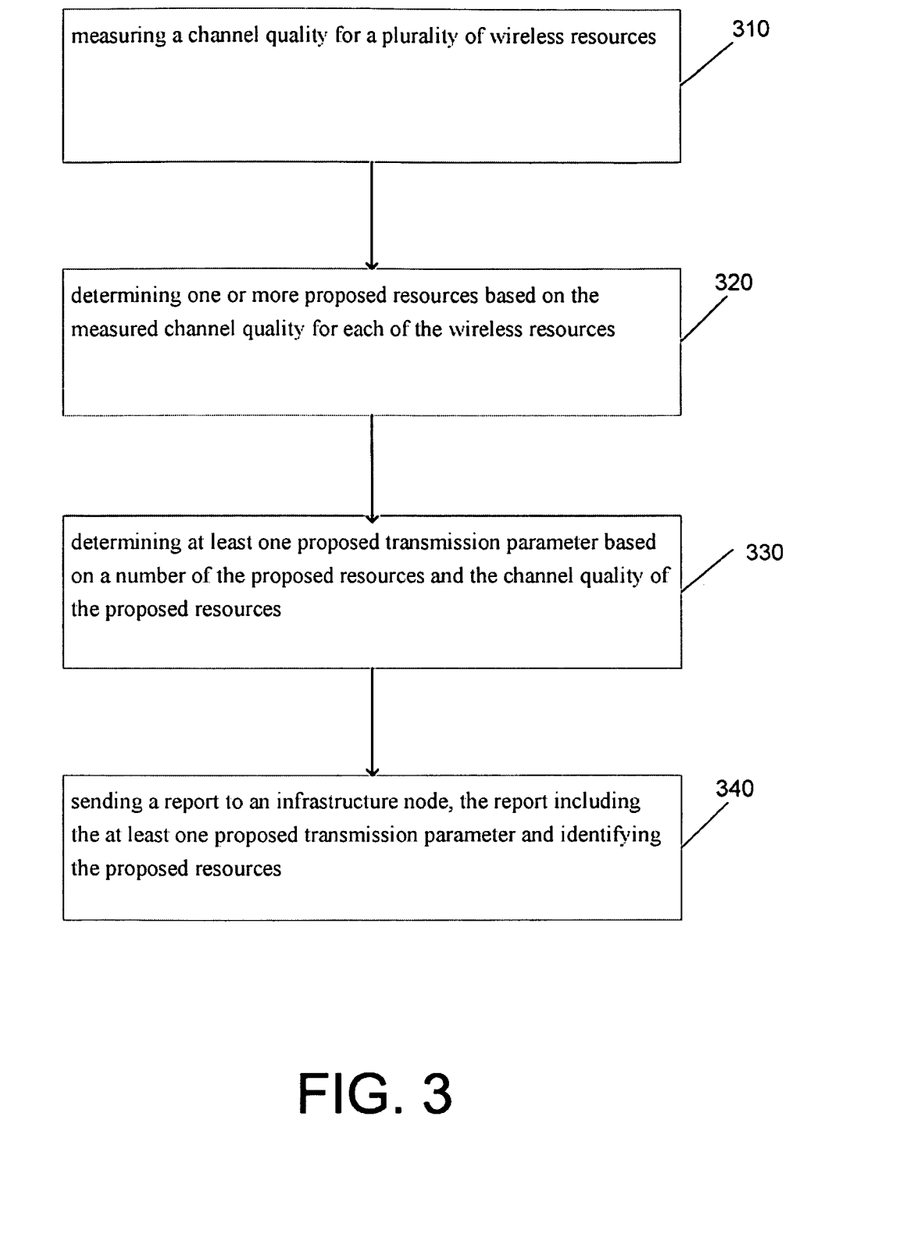
FIG. 3 is a flow chart illustrating operation of a wireless node according to an example embodiment.

FIG. 3 is a flow chart illustrating the operation of a wireless node for determining the channel quality according to an example embodiment. At 310 a channel quality may be measured for a plurality of wireless resources (e.g., PRBs).

For example, wireless transceiver 602 may receive signals, such as SINR or received signal strength signals, which may be provided to processor or controller 604.

At 320, one or more proposed wireless resources may be determined based on the measured channel quality for each of the wireless resources. Processor or controller 604 may determine proposed wireless resources, e.g., based on received channel quality. This may involve, for example, processor or controller 604 determining or selecting the M resources having the best channel quality, for example.

At 330, at least one proposed transmission parameter may be determined (e.g., by processor or controller 604) based on a number of the proposed wireless resources and the channel quality of the proposed wireless resources.

At 340, a report may be sent to an infrastructure node, the report including the at least one proposed transmission parameter and identifying the proposed wireless resources. In an example embodiment, the report may be generated by processor or controller 604, and then transmitted via wireless link by wireless transceiver 602.

Figure 4:
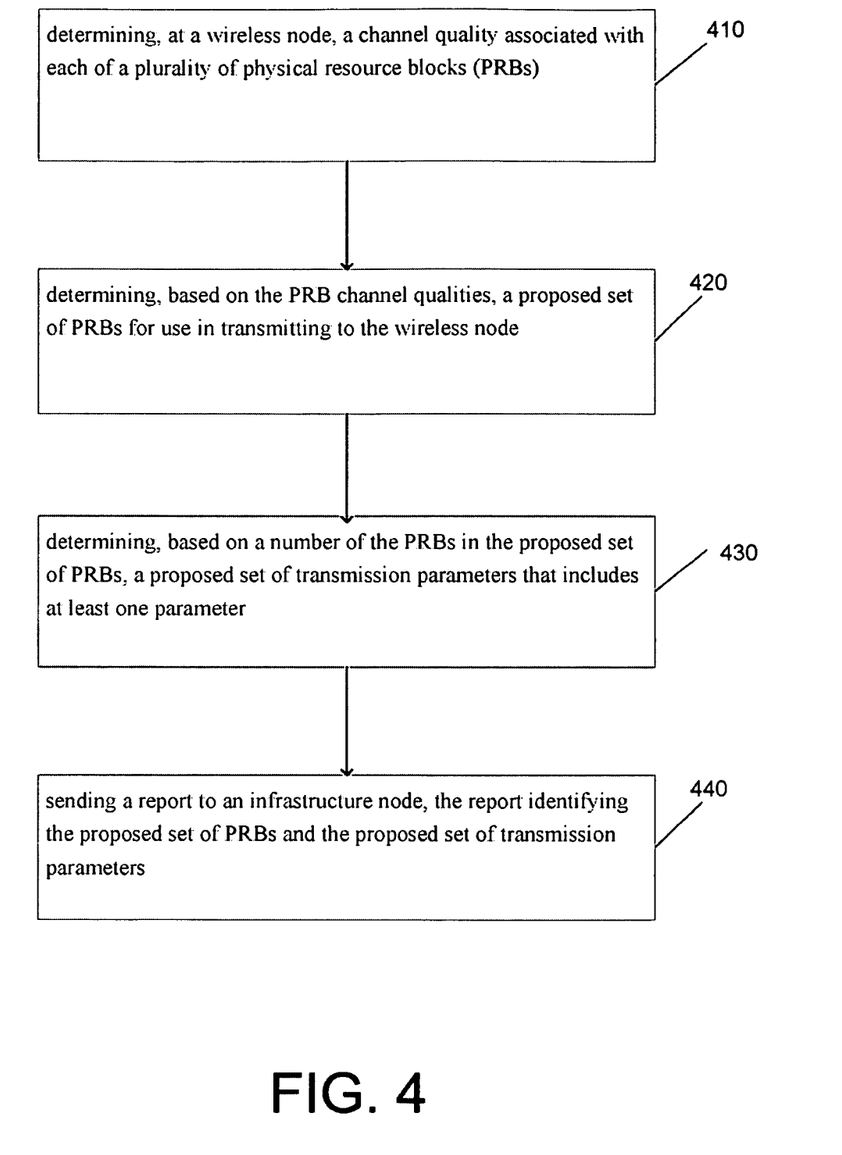
FIG. 4 is a flow chart illustrating operation of a wireless node according to another example embodiment.

FIG. 4 is a flow chart illustrating operation of a wireless node according to another example embodiment. At 410, at a wireless node, a channel quality associated with each of a plurality of physical resource blocks (PRBs) may be determined (e.g., by processor or controller 604 based on signals received from wireless transceiver 602).

At 420, a proposed set of PRBs for use in transmitting to the wireless node may be determined (e.g., by processor or controller 604) based on the PRB channel qualities.

At 430, a proposed set of transmission parameters that includes at least one parameter based may be determined (e.g., by processor or controller 604) based on a number of the PRBs in the proposed set of PRBs.

At 440, a report may be sent to an infrastructure node, the report identifying the proposed set of PRBs and the proposed set of transmission parameters. The report may, for example, be generated by processor or controller 604, and then transmitted via wireless link by wireless transceiver 602.

Figure 5:
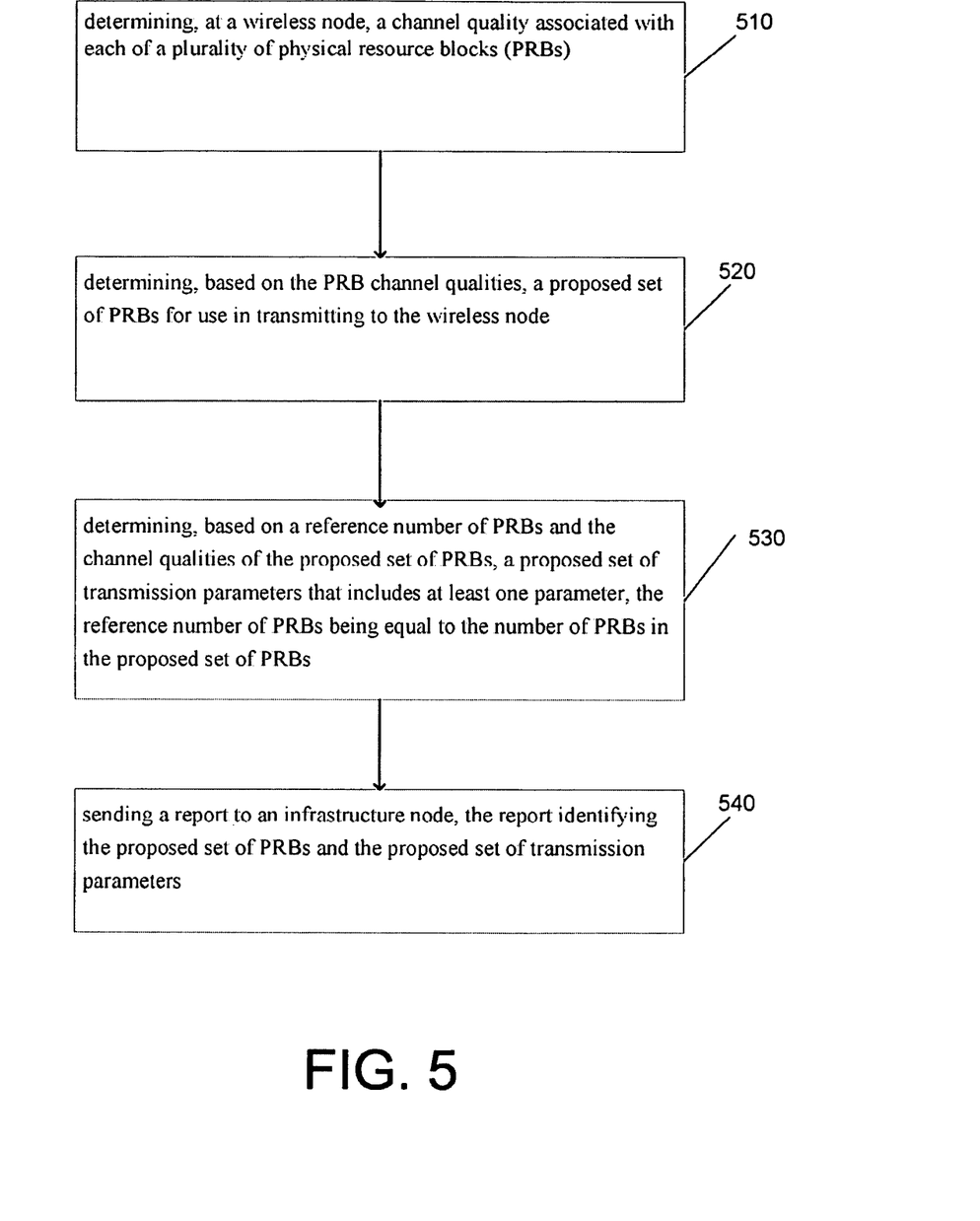
FIG. 5 is a flow chart illustrating operation of a wireless node according to yet another example embodiment.

FIG. 5 is a flow chart illustrating operation of a wireless node according to yet another example embodiment. At 510, at a wireless node, a channel quality associated with each of a plurality of physical resource blocks (PRBs) may be determined (e.g., determined by processor or controller 604 based on signals received via wireless transceiver 602).

At 520, a proposed set of PRBs for use in transmitting to the wireless node may be determined (e.g., by processor or controller 604) based on the PRB channel qualities.

At 530, a proposed set of transmission parameters may be determined (e.g., by processor or controller 604) based on a reference number of PRBs and the channel qualities of the proposed set of PRBs, the proposed set of transmission parameters including at least one parameter, the reference number of PRBs being equal to the number of PRBs in the proposed set of PRBs.

At 540, a report may be sent to an infrastructure node, the report identifying the proposed set of PRBs and the proposed set of transmission parameters. For example, the report may be generated by processor or controller 604 and transmitted by wireless transceiver 602.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

The invention claimed is:

1. A method comprising:
   determining, at a wireless node, a proposed set of physical resource blocks for a transmission to the wireless node, based on a channel quality determination at the wireless node, wherein the proposed set of physical resource blocks comprises one or more orthogonal frequency division multiplexing subcarriers;
   sending a channel quality indicator report to an infrastructure node, the report including a parameter ID identifying, for the transmission to the wireless node, a modulation scheme and a coding rate at which a block error probability is determined, using an overall channel quality for the proposed set of physical resource blocks and a reference physical resource size for the transmission to the wireless node, to be less than or equal to a threshold or target level.

2. The method of claim 1, wherein the proposed set of physical resource blocks comprises one or more channels.

3. The method of claim 1, wherein the channel quality determination at the wireless node comprises measuring a signal to interference and noise ratio for each of a plurality of physical resource blocks.

4. The method of claim 1, wherein the determining the proposed set of physical resource blocks comprises using a best-M technique.

5. The method of claim 1, wherein the determining the proposed set of physical resource blocks comprises selecting M resources having a highest channel quality.

6. The method of claim 1, wherein the determining the proposed set of physical resource blocks comprises determining a set of M physical resource blocks having substantially the highest channel quality of the plurality of physical resource blocks, or determining a physical resource block having a highest channel quality and one or more other physical resource blocks having a channel quality within a threshold or distance of the highest channel quality physical resource blocks.

7. An apparatus comprising:
   at least one processor; and
   at least one memory including computer program code, the at least one memory and the computer program code configured, with the at least one processor, to cause the apparatus to:

determine, at the apparatus, a proposed set of physical resource blocks for a transmission to the apparatus, based on a channel quality determination at the apparatus, wherein the proposed set of physical resource blocks comprises one or more orthogonal frequency division multiplexing subcarriers;

send a channel quality indicator report to an infrastructure node, the report including a parameter ID identifying, for the transmission to the apparatus, a modulation scheme and a coding rate at which a block error probability is determined, using an overall channel quality for the proposed set of physical resource blocks and a reference physical resource size for the transmission to the apparatus, to be less than or equal to a threshold or target level.

8. The apparatus of claim 7, wherein determining the proposed set of physical resource blocks comprises using a best-M technique.

9. The method of claim 1, wherein the threshold or target level is approximately 10%.

10. The apparatus of claim 7, wherein the threshold or target level is approximately 10%.

11. The apparatus of claim 7, wherein the proposed set of physical resource blocks comprises one or more channels.

12. The apparatus of claim 7, wherein the channel quality determination at the apparatus comprises measuring a signal to interference and noise ratio for each of a plurality of physical resource blocks.

13. The apparatus of claim 7, wherein each of the physical resource blocks includes a plurality of subcarriers across a time slot, wherein the channel quality determination comprises determining an average signal to interference and noise ratio across the plurality of subcarriers of the physical resource blocks.

14. The apparatus of claim 7, wherein the determining the proposed set of physical resource blocks comprises selecting M resources having a highest channel quality.

15. The apparatus of claim 7, wherein the determining the proposed set of physical resource blocks comprises using a threshold channel quality indication technique.

16. The apparatus of claim 7, wherein the determining the proposed set of physical resource blocks comprises determining a set of M physical resource blocks having substantially the highest channel quality of the plurality of physical resource blocks, or determining a physical resource block having a highest channel quality and one or more other physical resource blocks having a channel quality within a threshold or distance of the highest channel quality physical resource blocks.

17. An apparatus comprising:
at least one processor; and
at least one memory including computer program code, the at least one memory and the computer program code configured, with the at least one processor, to cause the apparatus to:
allocate resources for a downlink transmission to a wireless node based on a channel quality indicator report received from the wireless node, wherein the channel quality indicator report includes a parameter ID identifying, for the transmission to the wireless node, a proposed set of physical resource blocks, wherein the proposed set of physical resource blocks comprises one or more orthogonal frequency division multiplexing subcarriers, and includes a modulation scheme and a coding rate at which a block error probability is determined, using an overall channel quality for the proposed set of physical resource blocks and a reference physical resource size for the transmission to the wireless node, to be less than or equal to a threshold or target level, wherein the proposed set of physical resource blocks is determined based on a channel quality determination at the wireless node.

18. The apparatus of claim 17, wherein the threshold or target level is approximately 10%.

* * * * *